US005211502A

United States Patent [19]

Upham-Hill

[11] Patent Number: 5,211,502

[45] Date of Patent: May 18, 1993

[54] CONNECTION SYSTEM

[76] Inventor: Christopher W. Upham-Hill, 74a Ashington Street, Dianella, West Australia, Australia

[21] Appl. No.: 671,903

[22] PCT Filed: Aug. 7, 1989

[86] PCT No.: PCT/AU89/00337

§ 371 Date: Mar. 15, 1991

§ 102(e) Date: Mar. 15, 1991

[87] PCT Pub. No.: WO90/01594

PCT Pub. Date: Feb. 22, 1990

[30] Foreign Application Priority Data

Aug. 8, 1988 [AU] Australia ................................ PI9713

[51] Int. Cl.[5] .............................................. F16B 13/04

[52] U.S. Cl. .................................... 403/353; 403/389; 403/407.1; 403/294; 52/239; 160/229.1

[58] Field of Search ............... 403/353, 387, 389, 384, 403/407.1, 188, 190, 187, 294, 292, 406.1; 52/239, 584; 160/135, 229.1

[56] References Cited

U.S. PATENT DOCUMENTS 3,276,172 10/1966 Alvden .............................. 52/584 X
3,339,954 9/1967 Alvden ............................ 403/292 X
3,425,721 2/1969 Agee ................................. 52/584 X
3,605,851 9/1971 Miles et al. ........................ 52/239 X
3,788,378 1/1974 Sobel ............................ 160/229.1 X
4,443,911 4/1984 Bannister .......................... 52/239 X
4,825,930 5/1989 Lindberg et al. .................. 160/135

FOREIGN PATENT DOCUMENTS 659258 8/1965 Belgium .
0109466 5/1984 European Pat. Off. .
0169697 1/1986 European Pat. Off. ............ 403/294
1457580 9/1966 France .

*Primary Examiner*—Andrew V. Kundrat
*Assistant Examiner*—Harry C. Kim
*Attorney, Agent, or Firm*—Harness, Dickey & Pierce

[57] ABSTRACT

A connection system in the form of an assembly of components which can be connected to one another relatively quickly. The connection system comprises first and second members and a connecting element for interconnecting the first and second members. The first and second members each having a face with a connecting aperture therein opening into an internal space within the member. The connection element comprises a bridge portion and a pair of spigot portions one at each end of the bridge portion and extending transversely of the bridge portion. In connecting the first and second members together, the spigot portions of the connecting element are inserted into the openings in the respective members and displaced with respect to the members such that each spigot portion is received and retained in portion of the internal space of the respective member.

21 Claims, 15 Drawing Sheets

CONNECTION SYSTEM

THIS INVENTION relates to a connection system.

The invention seeks to provide an assembly of components which can be connected to one another relatively quickly. The assembly is particularly suitable for use in the construction of partition walls, door frames and other structures.

In one form the invention resides in a connection system comprising first and second members and a connecting element for interconnecting the first and second members, said first and second members each having a face with a connecting aperture therein opening into an internal space within the member, said connection element comprising a bridge portion and a pair of spigot portions one at each end of the bridge portion and extending transversely of the bridge portion, wherein the first and second members are adapted to be interconnected by inserting the spigot portions of the connecting element into the openings in said members and displacing each spigot portion with respect to the respective member such that the spigot portion is received and retained in portion of the internal space of the member.

Preferably, said spigot portions extend transversely of the bridge portion in opposite directions with respect to each other.

Preferably, said bridge portion is adapted to engage against a portion of the peripheral edge of each connecting aperture when said spigot portions are received fully in the internal spaces.

Preferably, said spigot portions are substantially parallel with respect to each other.

Preferably, said connecting aperture is elongated.

In one arrangement, the connecting element and at least one of said members is adapted to resist relative rotation between said member and the connecting element. In this arrangement, the spigot portion and said portion of the internal space within said member are each of generally rectangular cross-section.

In another arrangement, the connecting element and at least one of said member may be adapted to facilitate relative rotation between the connecting element and said member. The relative rotation may be accomplished by relative rotation of the spigot in the internal space. With this arrangement, the spigot and said portion of the internal space within said member are generally circular in cross-section.

Preferably, said connecting aperture includes a transverse portion with Which the bridge member registers when the spigot is fully received in the respective member, said transverse portion being adapted to accommodate swinging movement of the bridge portion upon relative rotation between said connecting member and said member.

Where the connecting element and at least one of said members are adapted for relative rotation, said face of said member is preferably arcuate with this arrangement, it is desirable for the centre of curvature of said arcuate face to be coincident with the axis of rotation.

The invention will be better understood by reference to the following description of several specific embodiments thereof as shown in the accompanying drawings in which.

Figure 1:
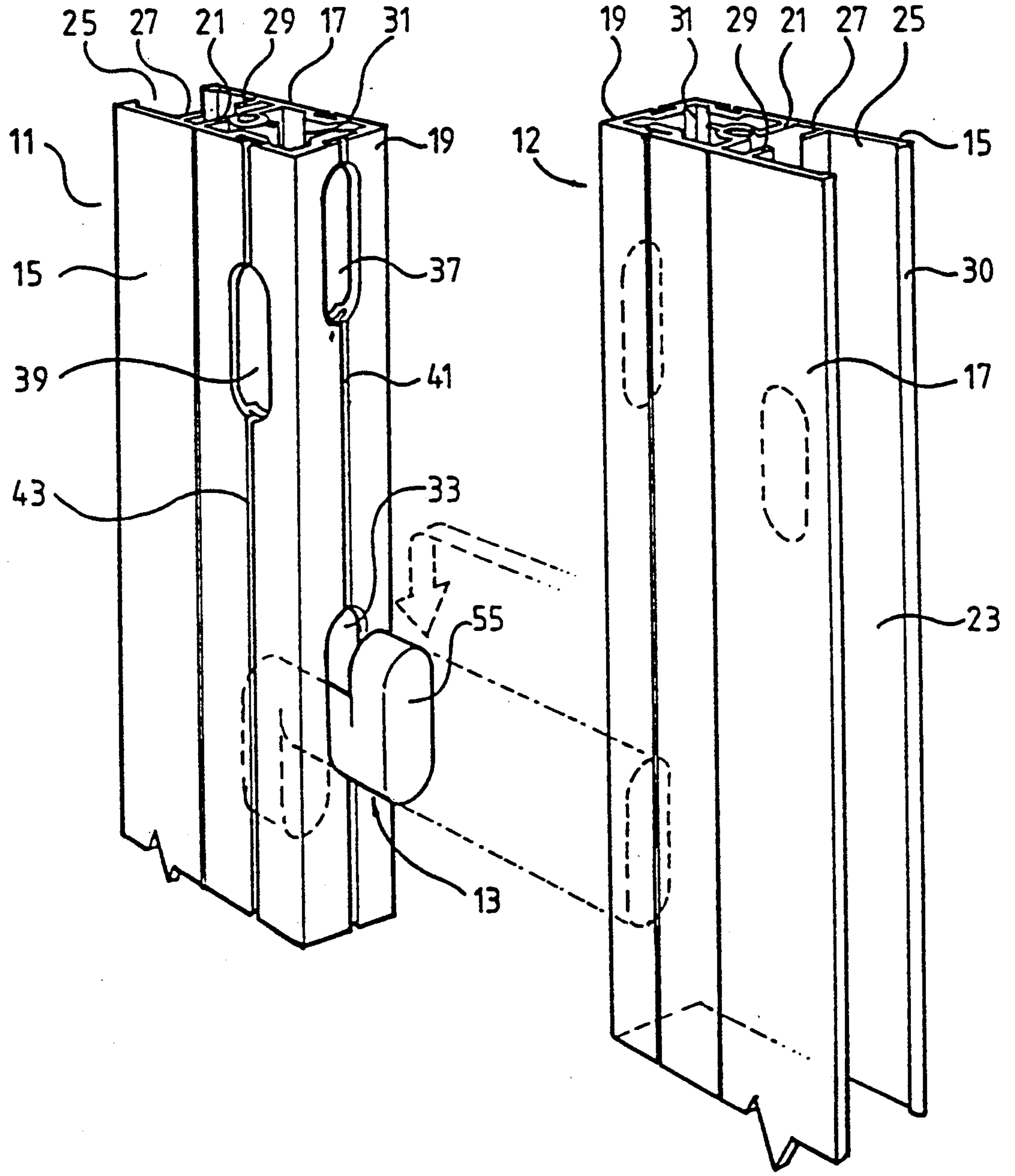
FIG. 1 is a fragmentary isometric view of a connection system according to a first embodiment, shown in a condition during assembly of the connection system.
Figure 2:
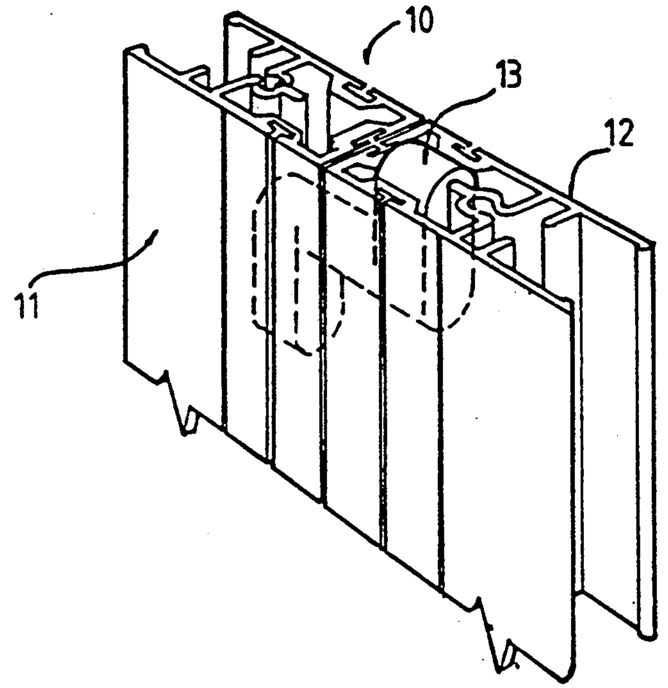
FIG. 2 is a fragmentary isometric view of the connection system of FIG. 1, shown in an assembled condition.

The connection system according to the first embodiment is shown in FIGS. 1 to 4 of the accompanying drawings and has been devised particularly for connecting panels together to form a rigid structure.

The connection system 10 comprises three components being a first member 11, a second member 12 and a connecting element 13 for interconnecting the first and second members. In this embodiment the first and second members 11 and 12 are elongated and in the form of lengths of a metal section of a profile shown in FIG. 3 of the drawings. The metal section which forms the first and second members comprises two longitudinal sides 15 and 17 interconnected by an outer web 19 and an inner Web 21. The outer web 19 extends between adjacent longitudinal edges of the sides 15 and 17 and is straight. The longitudinal edges 20 opposite the outer web 19 are not connected to each other and define a longitudinal opening 23 which communicates With a recess 25. The recess 25 is defined between the side walls 15 and 17 and opposed projections 27 and 29 extending inwardly from the side walls, and is arranged to receive an edge of a panel as will be explained in more detail later. Inwardly projecting protrusions 30 are provided on internal surfaces of the side walls adjacent the longitudinal edges 20 to facilitate positive engagement with the panel.

An internal space 31 extends longitudinally along the member between the outer web 19, the inner web 21 and the side walls 15 and 17. The space 31 includes an engaging portion 32 defined between the inner faces 33 of longitudinal ribs 35 within the member. In this embodiment, the engaging portion 32 is generally rectangular in cross-section.

Connecting apertures 37 opening onto the engaging portion 32 of the internal space 31 are provided at spaced intervals along the outer web 19. Further connecting apertures 39 also opening onto the engaging portion 32 of the internal space 31 are provided at spaced intervals along the side walls 15 and 17. The connecting apertures 37 and 39 are of elongated configuration and in alignment with the longitudinal axis of the elongated member, as shown in FIG. 1.

A longitudinal recess 41 extends along the outer face of the outer web 19 and longitudinal recesses 43 extend along the outer faces of the side walls 15 and 17. The recesses 41 and 43 are adapted to receive and support inserts which may be employed for a variety of purposes such as decoration or sealing against weather or dust.

A further internal space 45 is defined between the intermediate web 21, the internal projections 27 and 29 and the side walls 15 and 17. The further internal space 45 is arranged to receive a corner element (not shown) for joining members together when they are employed as frame elements.

Figure 4:
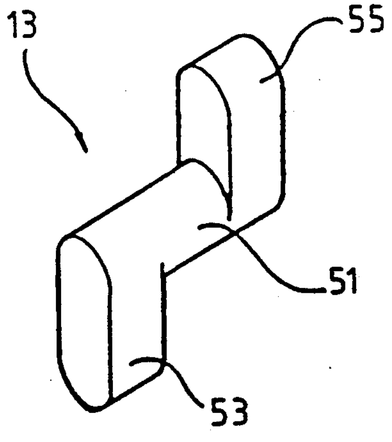
FIG. 4 is an isometric view of a connecting element which forms part of the connection system of the first embodiment.
Figure 5:
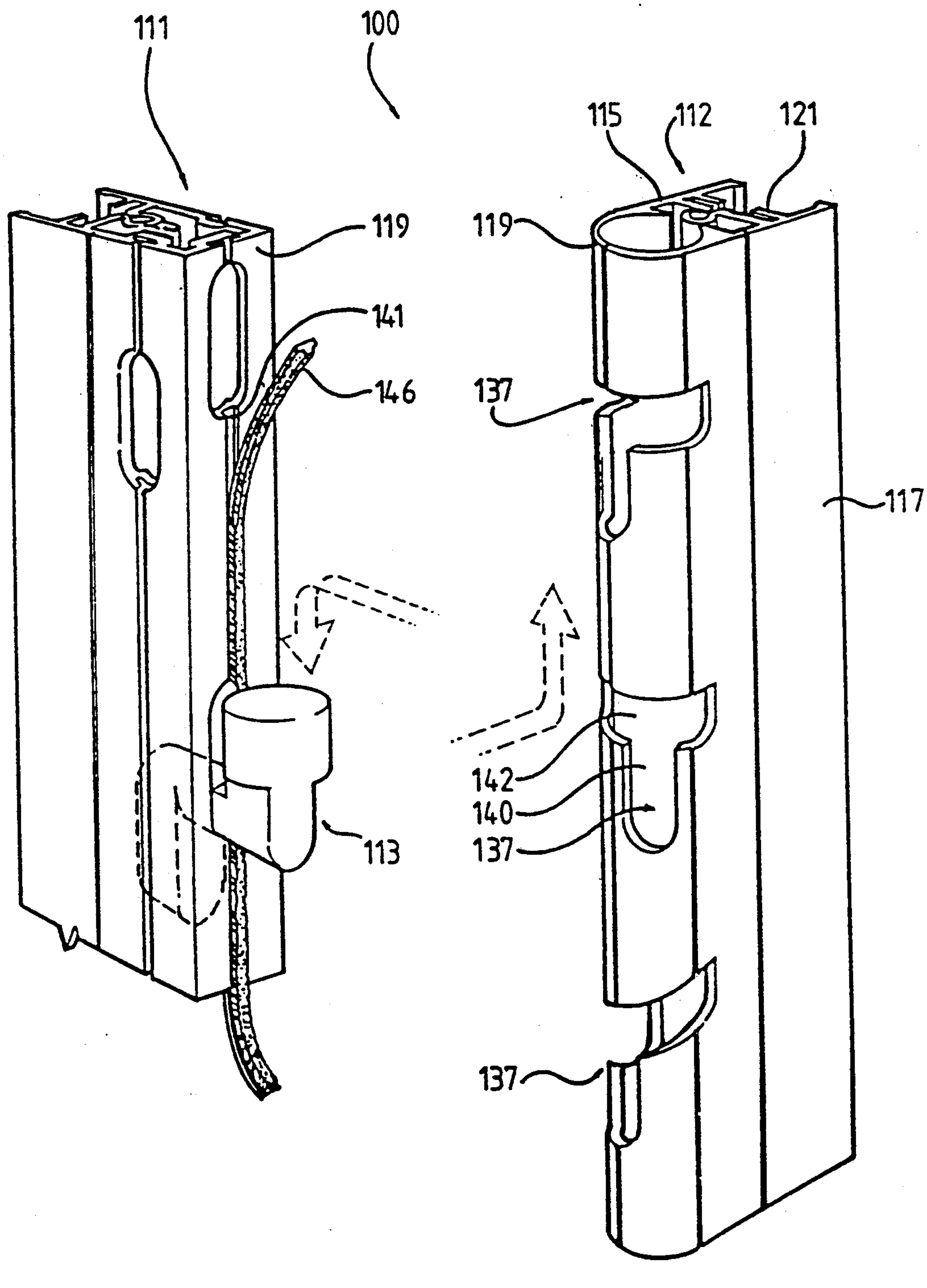
FIG. 5 is a fragmentary isometric view of a connection system according to a second embodiment, shown in a condition during assembly of the connection system.
Figure 6:
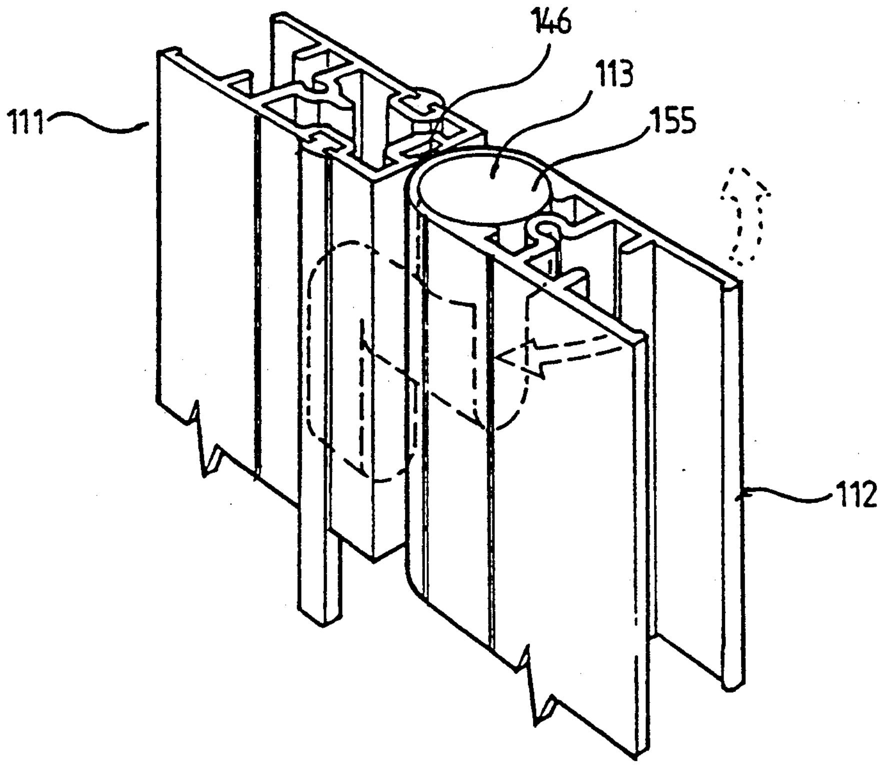
FIG. 6 is a fragmentary isometric view of the connection system of FIG. 5 shown in an assembled condition.

The connecting element 13 is provided for interconnecting the first and second members 11 and 12 respectively. The interconnecting element in this embodiment is best seen in FIG. 4 of the drawings and comprises a bridge portion 5 and two spigot portions 53, 55 one at each end of the bridge portion. The two spigot portions 53 and 55 extend transversely of the bridge portion in opposite directions with respect to each other. In the drawings, spigot portion 53 is shown extending in a downward direction and spigot portion 55 is shown extending in an upward direction.

The manner in which the members 11 and 12 are connected together using the connecting element 13 will now be described with particular reference to FIG. 1 of the drawings. The downwardly extending spigot portion 53 of the connecting element is aligned with, and then inserted into, one of the connecting apertures 37 in the first member 11 so as to be received in the internal space 31 thereof. The connecting element is then pushed downwardly into the position shown in FIG. 1 where the spigot portion is received snugly within the engaging portion 32 internal space, and the lower surface of the bridge portion 51 rests on the lower edge of the connecting aperture 37. The members 11 and 12 are moved relative to each other until the upwardly extending spigot portion 55 is aligned with, and then inserted into, the corresponding connecting aperture 37 in the second member 12 so as to be received in the internal space 31 thereof. The second member 12 is then pushed downwardly into the position shown in FIG. 2 where the upper surface of the connecting aperture 37 in the member rests on the upper surface of the bridge portion 51 of the connecting element, and the spigot portion 55 is snugly received within the engaging portion 32 of the internal space within the second member 12.

From the foregoing description, it can be seen that the three components of the connection system can be assembled and disassembled relatively easily and quickly. The connection so provided is sturdy and is therefore particularly suitable for forming rigid structures such as partition walls where partitioning panels are connected rigidly one to another.

A connection system according to a second embodiment is shown in FIGS. 5, 6, 7 and 8 of the accompanying drawings. The connection system 100 of the second embodiment is arranged to connect parts such as panels together in a manner which allows one such part to pivot relative to the other part. This arrangement is particularly suitable for use Where a door is to be mounted onto a partition wall.

Figure 3:
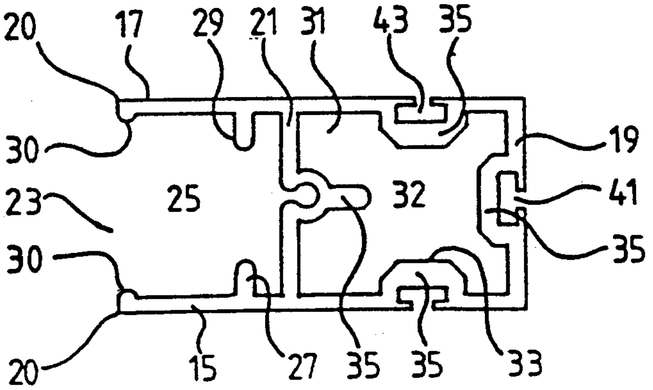
FIG. 3 is an end view of one of the members of the connection system of the first embodiment.
Figure 7:
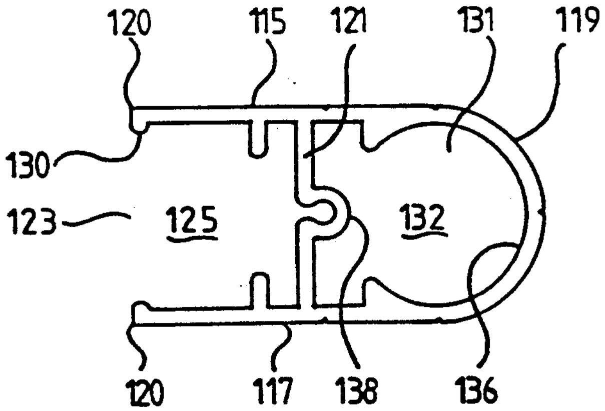
FIG. 7 is an end view of one of the members forming part of the connection system according to the second embodiment.

The connection system 100 according to the second embodiment comprises three components being a first member 111, a second member 112 and a connecting element 113 for interconnecting the first and second members. The first and second members 111 and 112 are elongated. The first member 111 is in the form of a metal section of a profile which is the same as the members 11 and 12 of the first embodiment as shown in FIG. 3 of the drawings. The second member 112 is also in the form of a length of metal section but of a different profile, as shown in FIG. 7 of the drawings.

The metal section which forms the second member 112 comprises two longitudinal sides 115 and 117 interconnected by an outer web 119 and an inner web 121. The outer web 119 extends between adjacent longitudinal edges of the sides 115 and 117 and is of an arcuate configuration, as illustrated in FIG. 7. The longitudinal edges 120 opposite the outer web 119 are not connected to each other and define a longitudinal opening 123 which communicates with a recess 125. As with the recess in the metal section of the first embodiment, the recess 125 in the metal section of this embodiment is arranged to receive an edge of a panel. Inwardly projecting protrusions 130 are provided on internal surfaces of the side walls adjacent to the longitudinal edges 120 to facilitate positive engagement with the panel.

An internal space 131 extends longitudinally along the member 112 between the outer web 119, the inner web 12 and the side walls 115 and 117. The internal space 131 includes an engaging portion 132 defined between an internal face 136 within the metal section and a longitudinal rib 138 within the metal section. In this embodiment, the internal face 136 is arcuate whereby the engaging portion is generally circular in cross-section, as best seen in FIG. 7 of the drawings.

Connecting apertures 137 opening onto the engaging portion 132 of the internal space 131 are provided at spaced intervals along the arcuate outer web 119. Further connecting apertures (not shown) also opening into the engaging portion 132 of the internal space 131 may be provided at spaced intervals along the side walls 115 and 117. The connecting apertures 137 each comprise a longitudinal section 140 in alignment with the longitudinal axis of the elongated member 112 and a transverse section 142 at one end of the longitudinal section and extending transversely thereof.

A longitudinal recess 141 extends along the outer face of the outer web 119 and longitudinal recesses 143 extend along the outer faces of the side walls 115 and 117. An insert 146 in the form of a dust seal is received and supported in the recess 141.

A further internal space 145 is defined between the intermediate web 121 and opposed projections 127 and 129 extending inwardly from the side walls 115 and 117.

Figure 8:
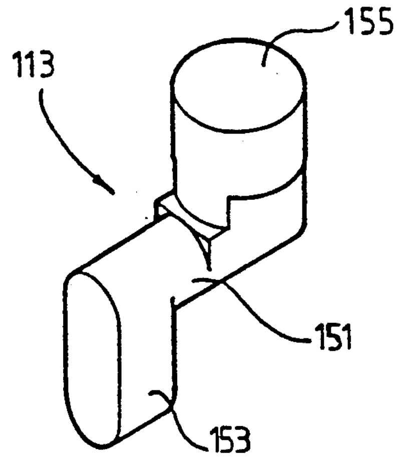
FIG. 8 is an isometric view of a connecting element forming part of the connection system of the second embodiment.

The connecting element 113 is provided for interconnecting the first and second members 111 and 112 respectively. The connecting element in this embodiment is best seen in FIG. 8 of the drawings and comprises a bridge portion 151 and two spigot portions 153, 155 one at each end of the bridge portion 151 The two spigot portions 153 and 155 extend transversely of the bridge portion in opposite directions with respect to each other. In the drawings, spigot portion 153 is shown extending in a downward direction and spigot portion 155 is shown extending in an upward direction. The downwardly extending spigot portion 153 is of a generally rectangular configuration similar to the spigot portions 53 and 55 of the connecting element 13 of the first embodiment. The upwardly extending spigot portion 155 differs from the spigot portion 153 in that it is of generally circular configuration to correspond with the internal configuration of the engaging portion 132 of the second member 112.

The three components of the connection system according to the second embodiment are connected together in a similar way to the three components of the connection system according to the first embodiment. In the second embodiment, however, the upwardly extending spigot portion 155 can rotate within the circular engaging portion 132 of the second member 112 owing to the complementary circular configurations of the spigot and engaging portion. The transverse portion 142 of the connecting aperture 137 accommodates relative rotation between the member 112 and the connecting element 113. With this arrangement, the second member 112 (together with any panel connected thereto) can rotate relative to the first member 111. The dust seal 146 supported on the first member brushes against the arcuate outer face of the outer web 119 of second member 112 upon relative rotation between the members.

Figure 9:
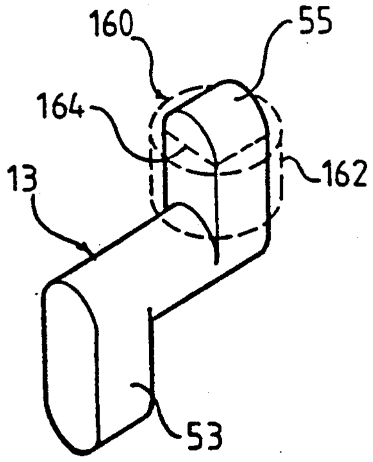
FIG. 9 is an isometric view of an alternative form of connecting element for the connection system of the second embodiment.

The connecting element 13 of the first embodiment can be modified to perform the task of the connecting element 113 of the second embodiment if so desired Referring to FIG. 9 of the drawings, the modification to the connecting element 13 involves the fitting of a sleeve 160 onto one of the spigot portions In the illustrated arrangement, the sleeve 160 is fitted onto the upwardly extending spigot portion 55. The sleeve can be formed of any suitable material such as low friction plastics material. The sleeve has a cylindrical outer surface 162 and a central hole 164 of rectangular configuration complementary to the rectangular cross section of the upwardly extending spigot 55.

Figure 10:
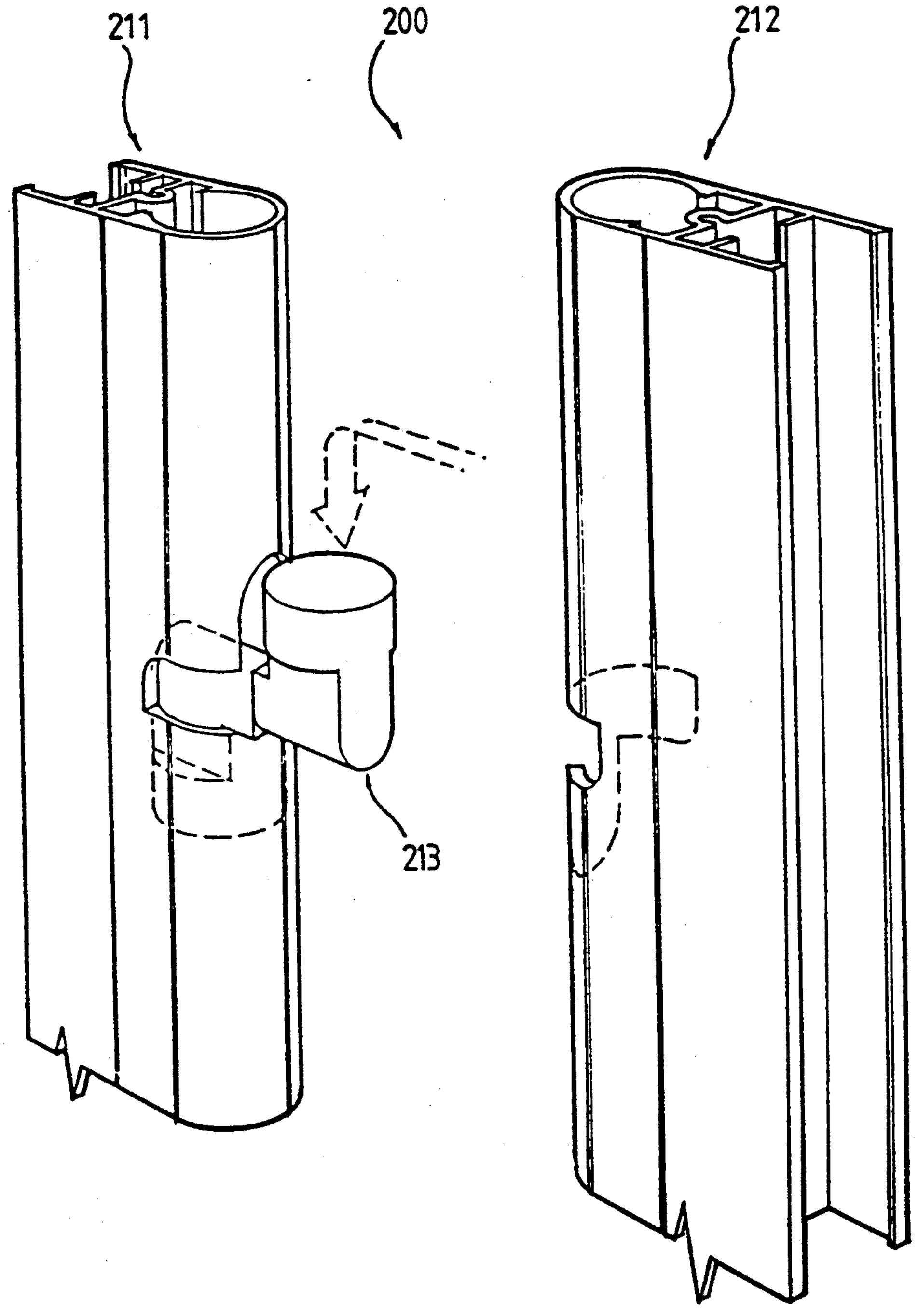
FIG. 10 is a fragmentary isometric view of connection system according to a third embodiment, shown in a condition during assembly.
Figure 11:
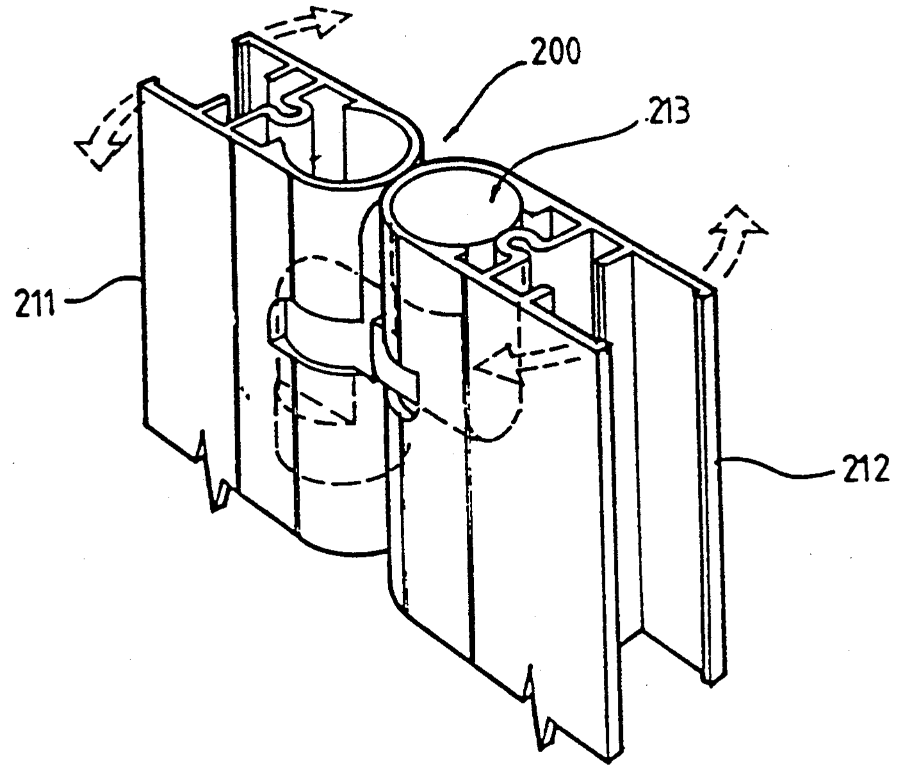
FIG. 11 is an isometric view of the connection system of FIG. 10, shown in an assembled condition.
Figure 12:
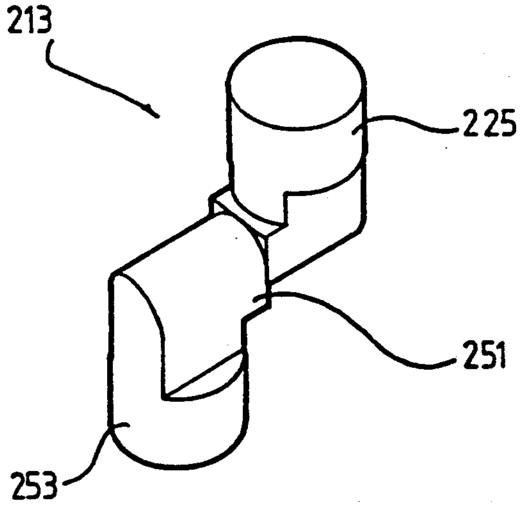
FIG. 12 is an isometric view of a connecting element which forms part of the connection system according to the third embodiment.
Figure 13:
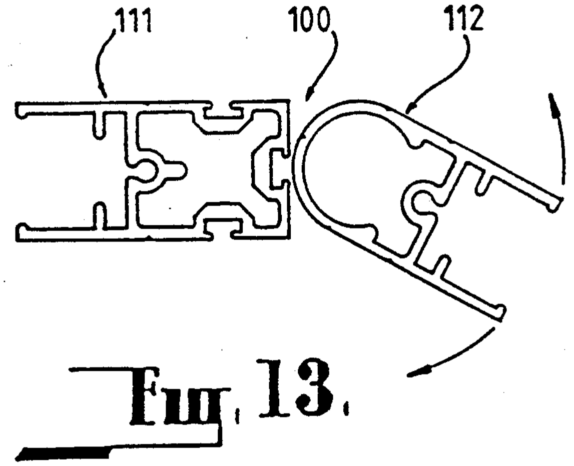
FIGS. 13 to 16 illustrate a series of ways in which the connection system of the second embodiment can be employed.
Figure 14:
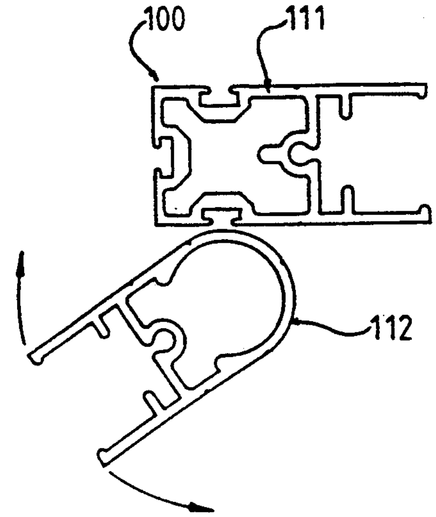
Figure 15:
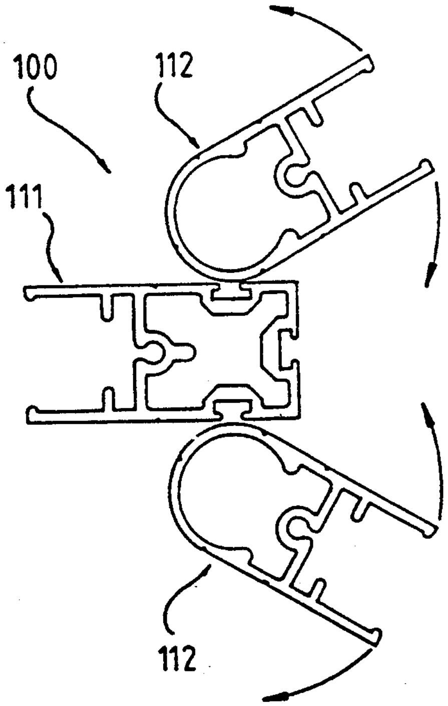
Figure 16:
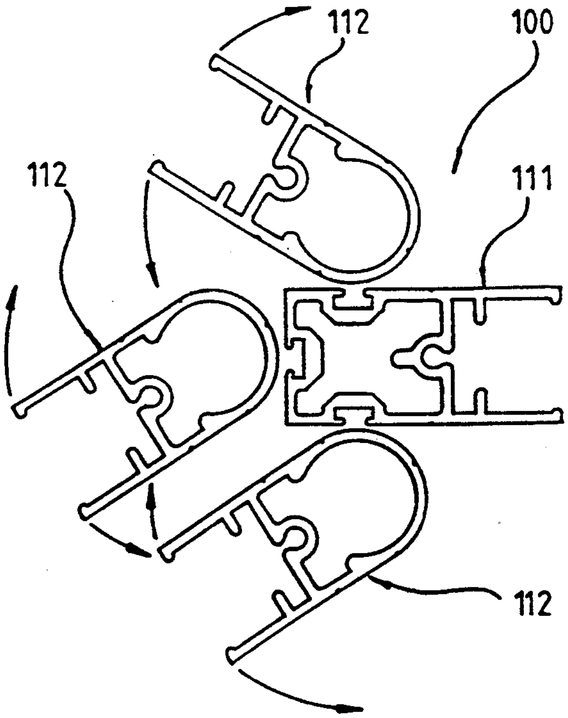

A connection system according to a third embodiment is shown in FIGS. 10, 11 and 12 of the accompanying drawings. The connection system 200 of the third embodiment is arranged to connect parts such as panels together in such a manner as to allow each part to undergo pivotal movement relative to the other. The connection system 200 according to the third embodiment comprises three components being a first member 211, a second member 212 and a connecting element 213 for interconnecting the first and second members The first and second members 211 and 212 are elongated and each is in the form of a length of metal section of a profile which is the same as the second member 112 of the second embodiment, as shown in FIG. 7 of the accompanying drawings.

The connecting element 213 of this embodiment is best seen in FIG. 12 of the drawings and comprises a bridge portion 251 and two spigot portions 253, 255 one at each end of the bridge portion 251. As with the previous embodiments, the two spigot portions extend transversely of the bridge portion in opposite directions with respect to each other. The spigot portions 253, 255 are each of generally circular configuration to correspond to the internal configuration of the engaging portion of the two members 211 and 212.

With this arrangement each spigot portion can rotate within the engaging portion of the respective member in which it is received.

The connecting elements 13 and 113 of the first and second embodiments can be modified for use in the connection system according to the third embodiment by fitting a sleeve onto each spigot portion of rectangular cross-section, each such sleeve being similar to sleeve 160 shown in FIG. 9.

Referring to FIGS. 13 to 16 of the accompanying drawings, there are shown various arrangements of a connection system according to the second embodiment. It will be noted that the second member can be connected adjacent the outer web of the first member or adjacent one of the side walls of the first member.

Figure 17:
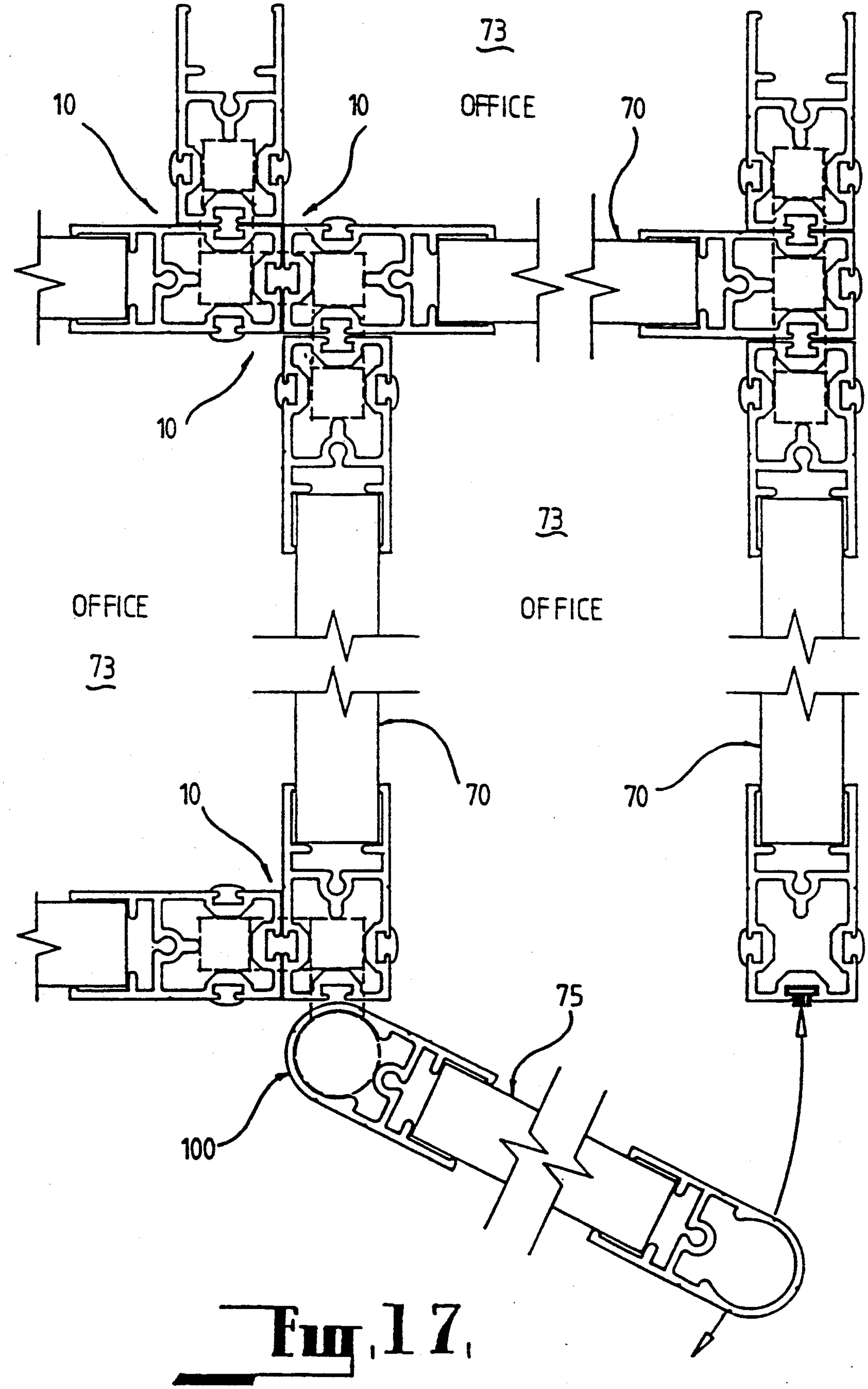
FIG. 17 is a schematic plan view of partitioning system erected to construct a series of rooms, the partitioning system employing connection systems according to the first and second embodiments.
Figure 18:
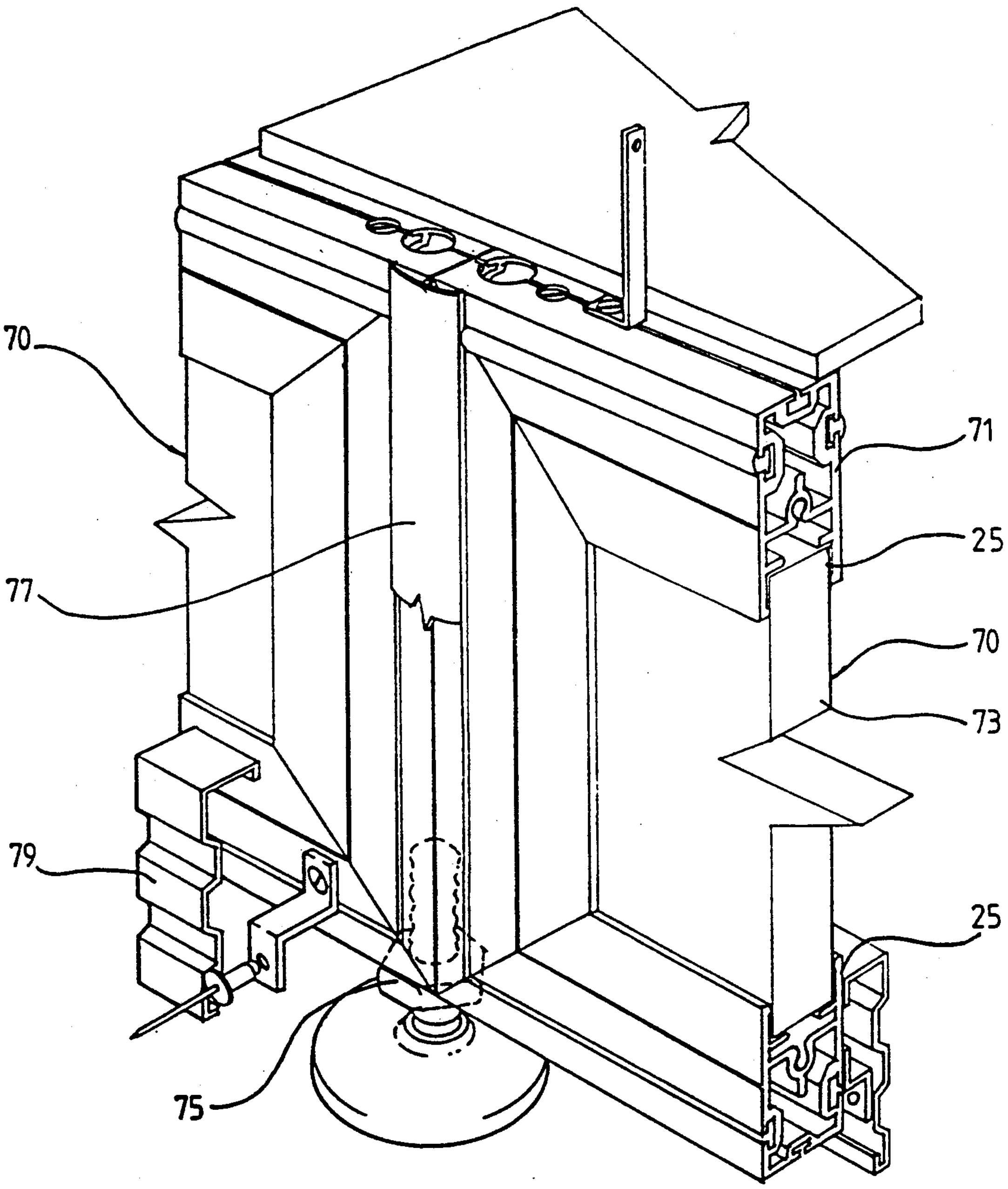
FIG. 18 is a fragmentary view of the partition system of FIG. 17.

Referring now to FIGS. 17 and 18 of the drawings, there is shown a partitioning system which employs connection systems according to the first and second embodiments. The partitioning system comprises a series of panels 70 arranged to define rooms 73. At various corners of the rooms the panels are interconnected by connection systems according to the first embodiment. One room is shown with a door 75 which is mounted onto a partition wall by a connection system 100 according to the second embodiment.

As best seen in FIG. 18, each panel 70 is constructed using frame elements 71 each in the form of length of a metal section of the profile shown in FIG. 3 of the drawings The frame elements surround a central panel member 73 the longitudinal edges of which are received in the recesses 25 of the frame elements Adjustable feet 75 of conventional construction are provided at the base of the connection system. A cover strip 77 is fitted between the abutting frame elements at the junction provided by the connection system, for aesthetic purposes The longitudinal edges of the cover strip 77 are engaged each in one of the longitudinal recesses 43 in the first and second members of the connection system. A skirting 79 is fitted to the frame elements to provide a neat finish to the partition.

Figure 19:
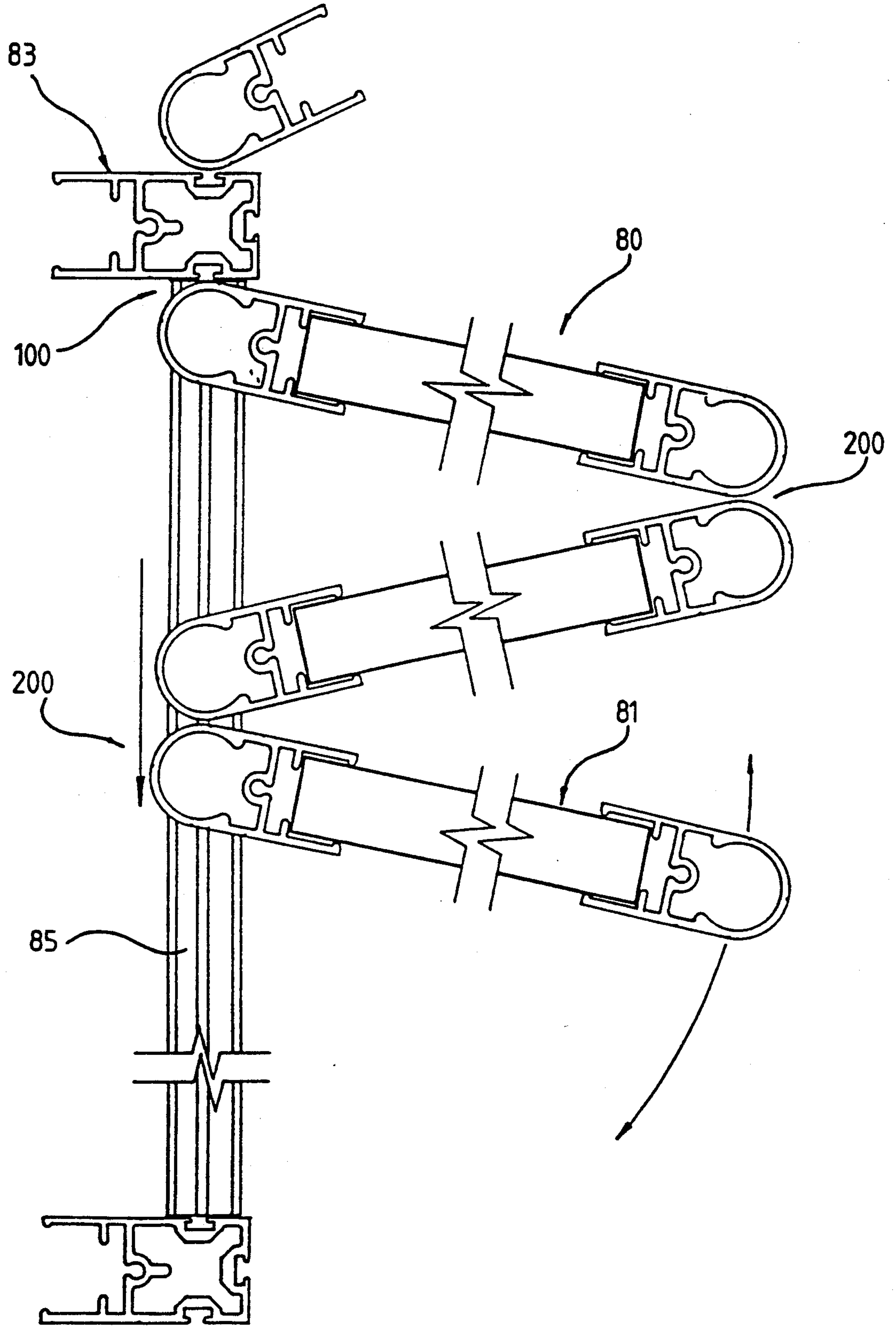
FIG. 19 is a plan view of a foldable door structure utilising connection systems according to the third embodiment.

Referring to FIG. 19 of the drawings, there is shown a concertina door 80 constructed using connection systems according to the second and third embodiments. The door 80 comprises a plurality of door panels 81 interconnected at adjacent edges by connection systems 200 according to the third embodiment. One edge of the door is pivotally connected to a wall 83 by way of a connection system 100 according to the second embodiment A track 85 is provided along which the door can slide in moving between the opened and closed conditions.

Figure 20:
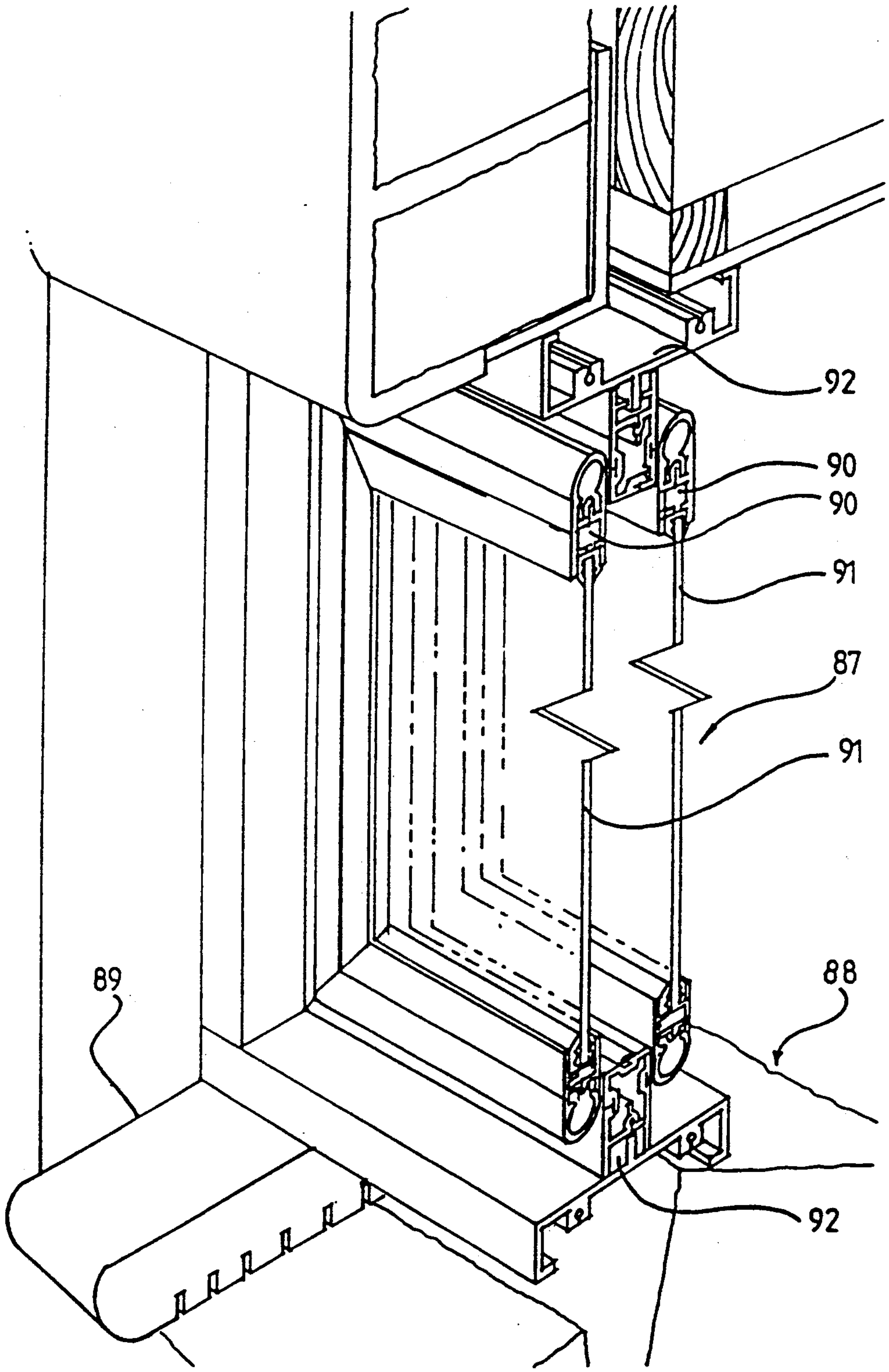
FIG. 20 is a fragmentary schematic view of a window structure for a building, the window structure employing connection systems according to the second embodiment.

FIG. 20 of the drawings shows a double sash window 87 using connection systems according to the second embodiment. The double sash window 87 is shown fitted in a cavity brick wall 88 and is provided with a sill 89.

The window comprises a pair of frames 90 constructed from lengths of metal section of a profile shown in FIG. 7 Each frame supports a panel 91 which may be in the form of a pane of glass or flyscreen material. The frames 90 are pivotally mounted on a surrounding frame structure 92 fixed into the wall 88. Although not shown in the drawing, each connected to the frame structure 92.

Figure 21:
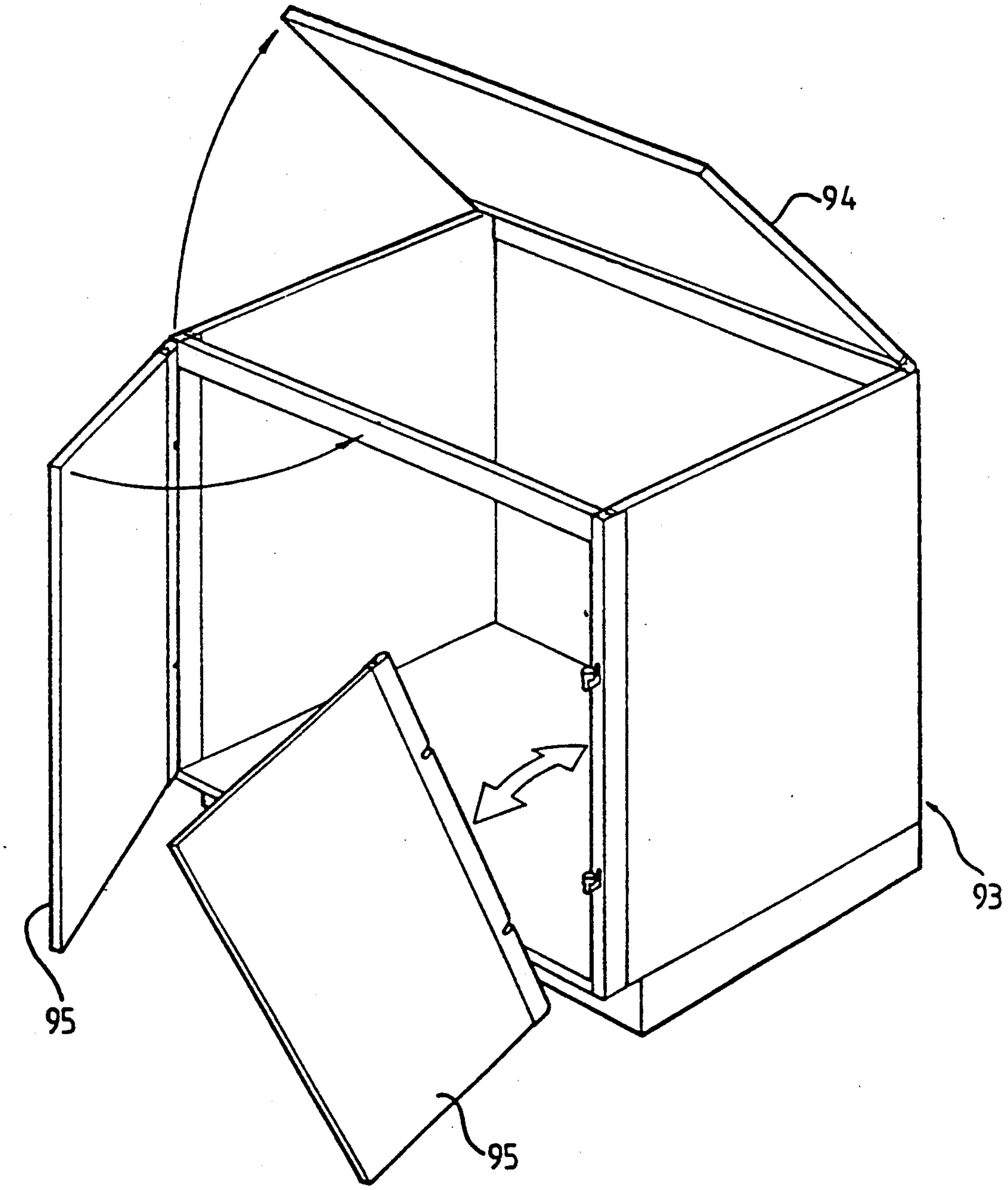
FIG. 21 is an isometric view showing the construction of a cupboard, said construction employing connection systems according to various embodiments)

Referring now to FIG. 21 of the drawings, there is shown a cupboard constructed using connection systems according to the various embodiments. The cupboard comprises a box structure 93 having a hinged lid 94 and a pair of hinged panel doors 95 which define the opening front of the cupboard. The hinged lid 94 and the front doors 95 are connected to the box structure by connection systems according to the second embodiment.

Figure 22:
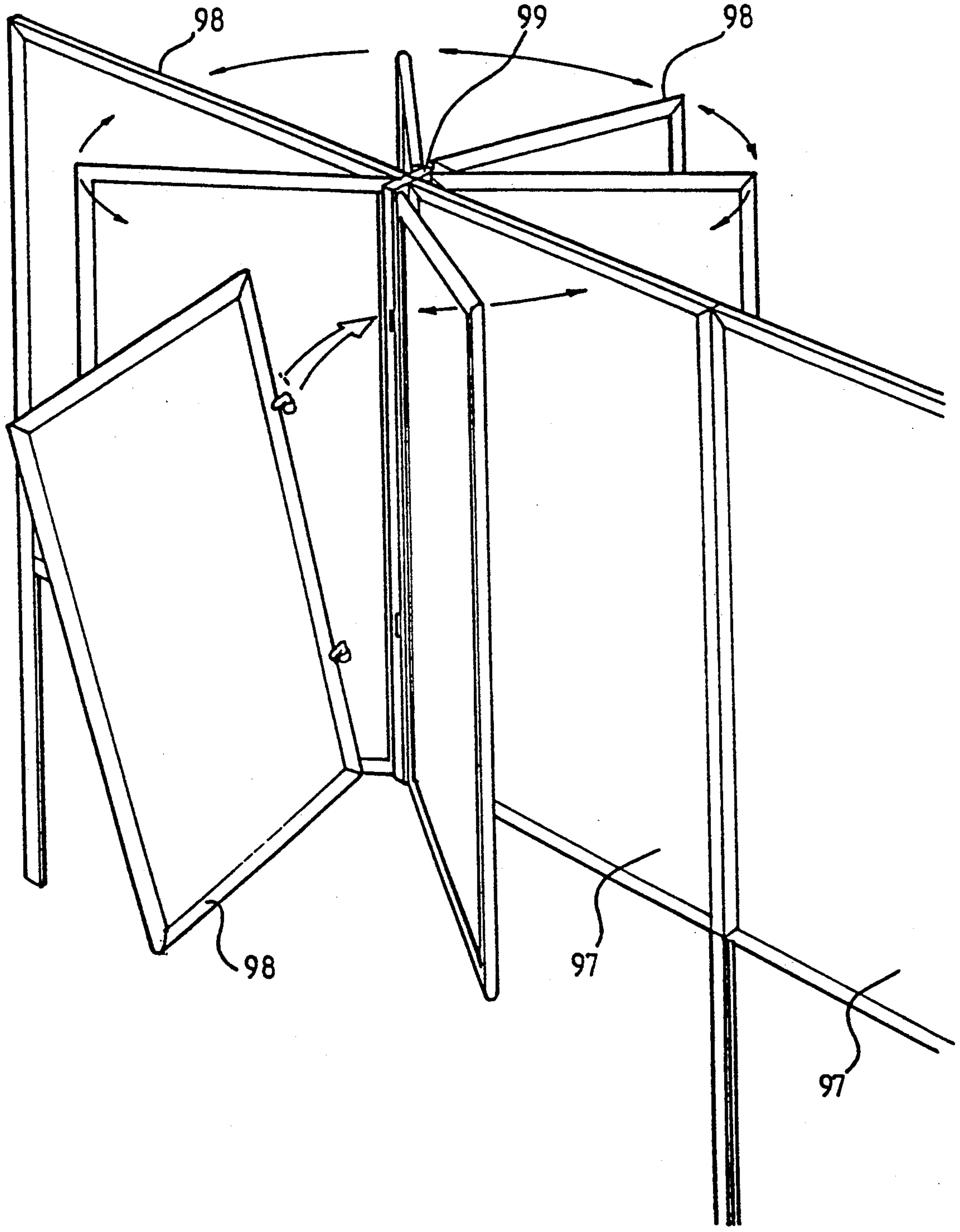
FIG. 22 is a schematic view of a display apparatus constructed using connection systems according to various embodiments.

Referring now to FIG. 22 of the drawings, there is shown a display system incorporating connection systems according to the various embodiments. The display system comprises a plurality of display panels 97 connected rigidly one to another using connection systems according to the first embodiment to provide a display surface. The display system also includes a plurality of movable display panels 98 connected to a central support 99 using connection systems according to the second embodiment.

It should be appreciated that the scope of the invention is not limited to the scope of the various embodiments which have been described. In particular, it should be understood that the connection system can be employed to connect members of a form other than panels.

I claim:

1. A connection system comprising first and second members and a connecting element for interconnecting the first and second members, said first and second members each having a face with a connecting aperture therein opening into an internal space within the member, said connecting element comprising a bridge portion and a pair of spigot portions one at each end of the bridge portion and extending transversely of the bridge portion along a spigot axis; wherein the internal space of each member includes means for restraining the spigot portion against tilting movement about the spigot axis, said restraining means including an engaging portion for snugly receiving the respective spigot portion and wherein said engaging portion is bounded by a peripheral structure defined within the member and adapted to cooperate with the spigot portion to restrain the spigot portion against tilting movement within the engaging portion about the spigot axis; said first and second members being interconnected by inserting the spigot portions of the connecting element into the openings in said members and displacing each spigot portion with respect to the respective member along the spigot axis such that the spigot portion is snugly received and retained in said engaging portion of the internal space of the member.

2. A connection system according to claim 1 wherein said bridge portion is adapted to engage against a portion of the peripheral edge of each connecting aperture when said spigot portions are received fully in the internal spaces.

3. A connection system according to claim 1 wherein said spigot portions extend transversely of the bridge portion in opposite directions with respect to each other.

4. A connection system according to claim 1, wherein said spigot portions are substantially parallel with respect to each other.

5. A connection system according to claim 1 wherein said connecting aperture is elongated.

6. A connection system according to claim 1 wherein said connecting element and at least one of said members is adapted to resist relative rotation between the member and the connecting element.

7. A connection system according to claim 1 wherein the spigot portion and said portion of the internal space within said member are each of generally rectangular cross-section.

8. A connection system according to claim 1 wherein the connecting element and at least one of said members is adapted to facilitate relative rotation between the connecting element and said member.

9. A connection system according to claim 8 wherein the spigot portion received in said member is rotatable within said member.

10. A connecting system according to claim 9 wherein the spigot and said portion of the internal space within said member are generally circular in cross-section

11. A connecting system according to claim 9 or 10 wherein said connecting aperture includes a transverse portion with which the bridge member of the connecting element registers when the spigot is fully received in the respective member, said transverse portion being adapted to accommodate swinging movement of the bridge portion upon relative rotation between said connecting member and said member.

12. A connecting system according to claim 8, wherein said face of said member is arcuate.

13. A connecting system according to claim 12 wherein the centre of curvature of said arcuate face to be coincident with the axis of rotation.

14. A connecting system according to claim 1 wherein said first and second members are adapted to be interconnected by a plurality of said connecting elements at spaced intervals along said faces.

15. A connecting system according to claim 1 wherein said first member comprises an elongated element.

16. A connecting system according to claim 1 wherein said second member comprises an elongated element.

17. A connecting system according to claim 15 wherein said elongated element is provided with a longitudinal cavity which defines said internal space.

18. A connecting system according to claim 15, wherein the or each elongated element is provided With a longitudinally extending recess adapted to receive and retain an edge portion of a panel.

19. A connecting system according to claim 16 wherein said elongated element is provided with a longitudinal cavity which defines said internal space.

20. A connecting system according to claim 1 wherein said peripheral structure includes at least one rib element extending longitudinally along said internal space of the member.

21. A connecting system comprising first and second members and a connecting element for interconnecting the first and second members, said first and second members each having a face with a connecting aperture therein opening into an internal space within the member, said connecting element comprising a bridge portion and a pair of spigot portions one at each end of the bridge portion and extending transversely of the bridge portion along a spigot axis; wherein the internal space of each member has an engaging portion for snugly receiving the respective spigot portion; said first and second members being interconnected by inserting the spigot portions of the connecting element into the openings in said members and displacing each spigot portion with respect to the respective member along the spigot axis such that the spigot portion is snugly received and retained in said engaging portion of the internal space of the member; and wherein each of said spigot portions of said connecting element extends a substantial distance along each respective spigot axis beyond said bridge portion; wherein said substantial distance is at least as great as the cross-sectional diameter of said bridge portion.

* * * * *

UNITED STATES PATENT AND TRADEMARK OFFICE

CERTIFICATE OF CORRECTION

PATENT NO. : 5,211,502

DATED : May 18, 1993

INVENTOR(S) : Christopher W. Upham-Hill

It is certified that error appears in the above-indentified patent and that said Letters Patent is hereby corrected as shown below:

Column 8, line 10, Claim 6, "connection" should be --connecting--.

Column 8, line 14, Claim 7, "connection" should be --connecting--.

Column 8, line 14, Claim 7, "1" should be --6--.

Column 8, line 18, Claim 8, "connection" should be --connecting--.

Column 8, line 22, Claim 9, "connection" should be --connecting--.

Column 8, line 29, Claim 11, delete "9 or".

Column 8, line 56, Claim 18, "With" should be --with--.

Signed and Sealed this

Twenty-ninth Day of March, 1994

*Attest:*

Bruce Lehman

BRUCE LEHMAN

*Attesting Officer*

*Commissioner of Patents and Trademarks*